United States Patent [19]

Osberghaus et al.

[11] Patent Number: 4,810,291
[45] Date of Patent: Mar. 7, 1989

[54] FLOOR CARE PREPARATION

[75] Inventors: Rainer Osberghaus, Duesseldorf; Gian D. Ameglio, Hilden; Harald Bossek, Duesseldorf; Karl-Heinz Rogmann, Ratingen, all of Fed. Rep. of Germany

[73] Assignee: Henkel Kommanditgesellschaft auf Aktien, Duesseldorf, Fed. Rep. of Germany

[21] Appl. No.: 95,297

[22] Filed: Sep. 10, 1987

[30] Foreign Application Priority Data

Sep. 11, 1986 [DE] Fed. Rep. of Germany ....... 3630905

[51] Int. Cl.$^4$ .......................... C09G 1/08; C08L 91/06
[52] U.S. Cl. ........................................ 106/10; 106/9; 106/287.11; 524/277
[58] Field of Search ................... 106/8, 9, 10, 287.11; 524/261, 277

[56] References Cited

U.S. PATENT DOCUMENTS

| | | | |
|---|---|---|---|
| 2,066,296 | 4/1932 | Lyons | 427/325 |
| 3,395,028 | 7/1968 | Mackles | 106/8 |
| 3,814,710 | 6/1974 | Duncan | 106/10 |
| 3,817,889 | 6/1974 | Fink | 524/838 |
| 3,960,575 | 6/1976 | Martin | 106/10 |
| 4,013,475 | 3/1977 | Liebowitz et al. | 106/11 |
| 4,711,805 | 12/1987 | Helmer et al. | 428/323 |

*Primary Examiner*—Paul Lieberman
*Assistant Examiner*—Christine A. Skane
*Attorney, Agent, or Firm*—Ernest G. Szoke; Wayne C. Jaeschke; Real J. Grandmaison

[57] ABSTRACT

A preparation containing hard wax, solid paraffin, microcrystalline wax, linseed oil and an aminofunctional silicone oil in an organic solvent is used for the care of floors of porous inorganic materials, particularly unglazed clay tiles. The preparation affords the floors excellent protection against aqueous and oily soil.

16 Claims, No Drawings

FLOOR CARE PREPARATION

BACKGROUND OF THE INVENTION

1. Field of the Invention

This invention relates to a floor care preparation, more especially for floors of porous inorganic materials, such as unglazed clay tiles, to the use of this preparation and to a method for the care of floors.

Floor coverings of porous inorganic materials, such as for example clay bricks or unglazed clay tiles, are sensitive to aqueous and greasy soil. Since soil of this type penetrates into the surface of such material on account of its porous structure, it is extremely difficult to remove the soil therefrom. Accordingly, attempts have long been made to find ways of treating such floor coverings with floor care preparations so that soil is unable to penetrate therein and can be removed more easily.

2. Discussion of Related Art

A process which has long been used comprises treating clay tiles with linseed oil and allowing the linseed oil to resinify on the tiles to form a protective layer. The susceptibility of the tiles to soil is clearly reduced in this way with the added effect of a very desirable deepening in the color of the tiles. The disadvantage of this process lies in particular in the fact that the linseed oil takes a relatively long time to dry, the tiles remaining very sensitive in the meantime.

In addition, highly concentrated, mostly pasty floor polishes consisting of waxes and organic solvents are used for floor care. Considerable effort is involved in the application and working in of these waxes, despite which the level of protection, particularly against oil and grease, is only moderate.

In principle, self-shine dispersions of the type recommended for the care of plastic floors are also suitable for the treatment of absorbent tiles. However, these dispersions do not penetrate sufficiently deeply into the tiles and, in addition, afford only poor protection against soil containing oil and grease, because oil and grease penetrate relatively quickly through the protective films formed by floor care preparations of this type.

It has now been found that the disadvantages of hitherto known floor care preparations can be overcome by using a certain combination of active substances.

DESCRIPTION OF THE INVENTION

Other than in the operating examples, or where otherwise indicated, all numbers expressing quantities of ingredients or reaction conditions used herein are to be understood as modified in all instances by the term "about".

The present invention relates to a floor-care preparation for floors of porous inorganic materials, more especially for unglazed tiles, in the form of a solution or dispersion in an apolar aprotic organic solvent which comprises hard wax, solid paraffin, microcrystalline wax, linseed oil and a silicone oil containing amino groups. The present invention also relates to the use of this floor care preparation for the care of floors of porous inorganic materials, particularly unglazed tiles, and to a corresponding method for floor care.

In the context of the invention, porous inorganic materials are understood to be solid materials which have open pores, i.e. pores communicating with the surface. Examples of inorganic materials such as these typically used as floor coverings include sandstone, travertine and similar limestones, concrete, but more especially unglazed ceramic products having a porous body, such as bricks and clay tiles.

The preparations according to the invention may be applied quickly and easily and hydrophobicize the treated surfaces in a very short time. By virtue of this water-repellent effect, aqueous soil does not penetrate into the porous material. At the same time, the combination of active substances according to the invention affords protection against oily and greasy soil which, likewise, is unable to penetrate into the materials and can therefore be easily removed. The preparations according to the invention provide a uniform deepening in the color of the floor covering, particularly where they are applied to clay tiles, which is a hallmark of a floor in good condition. Despite the high filling power of the preparations, the character of the tiles is otherwise unaffected.

The reason for the excellent effect of the preparations and, in particular, for the excellent protection they afford against oil-containing soil lies in the specific co-operation between the individual ingredients.

The preparations according to the invention preferably have the following composition, based on the weight of the composition;

from 2 to 15% by weight hard wax,
from 2 to 15% by weight paraffin,
from 0.2 to 15% by weight microcrystalline wax,
from 0.5 to 5% by weight linseed oil,
from 0.2 to 17% by weight silicone oil containing amino groups,
from 0 to 1% by weight standard additives, and
ad 100% by weight apolar aprotic solvent.

The individual components are discussed in more detail in the following.

Hard wax

Suitable hard waxes include natural waxes of vegetable origin, such as carnauba wax and candelilla wax, montanic acid and montanic ester waxes, oxidized synthetic paraffins optionally containing metal soaps, polyethylene waxes and polyvinyl ether waxes. Of these, montanic acid and montanic ester waxes, oxidized synthetic paraffin waxes, polyethylene waxes and mixtures thereof are preferably used. The proportion of wax in the preparations according to the invention is from 2 to 15% by weight, and preferably from 5 to 10% by weight.

Examples of the waxes preferably used are the types KSL, OP, R 21, PA 130 and PED 261 available from Hoechst. In general, natural vegetable waxes and special synthetic waxes, such as Hoechst's polyether wax V, are only incorporated as additives in small quantities.

Paraffin

By paraffin is meant a macrocrystalline paraffin wax consisting predominantly of unbranched paraffins, of the type obtained from the distillation of petroleum. The preferred paraffin is a refined paraffin (cake paraffin) which has a solidification point of from 52° to 62° C. The proportion of paraffin in the preparations according to the invention is from 2 to 15% by weight, and preferably from 3 to 8% by weight.

Microcrystalline wax

Like the macrocrystalline paraffin, this wax consists of a mixture of saturated, predominantly solid, hydrocarbons, although the isoparaffins and napthenic compounds are predominant in this case. It is normally obtained from petroleum. The waxes currently marketed under the name of ozocerite also belong to this group. Waxes having solidification points of from 65° to 100° C. and more especially from 66° to 76° C. are suitable as this component. The proportion of microcrystalline wax in the preparations according to the invention is from 0.2 to 15% by weight, and preferably from 0.5 to 5% by weight.

Linseed Oil

Drying oils of vegetable origin, i.e. oils containing a high percentage of polyunsaturated fatty acids, are suitable as this component. Linseed oil, particularly in refined form, is preferably used. The oil content of the preparations according to the invention is from 0.5 to 5% by weight, and preferably from 0.5 to 3% by weight. It is particularly preferred to use a siccative therewith which accelerates the resinification of the linseed oil. The siccatives in question include a salt of a polyvalent metal ion, such as cobalt and manganese, which are capable of accelerating the oxidative reactions leading to resinification. The siccative may be used in a quantity of from about 0.01 to 1% by weight metal ion salt, based on linseed oil. A premix of linseed oil and siccative, of the type known as linseed oil varnish, is preferably used in the production of the preparations, linseed oil, varnish corresponding to DIN 52 932 being particularly preferred.

Silicone oil

Suitable silicone oils include a silicone oil of the dimethyl siloxane type which additionally contains amino groups attached to silicon via carbon. The silicone oil in question may be both a polysiloxane containing amino groups and also a mixture of an unsubstituted polysiloxane and a low molecular weight aminoalkyl silane. The silicone oil preferably contains from 0.05 to 5% by weight, and more especially from 0.2 to 3% by weight, nitrogen in the form of amino groups. Examples of a silicone oil such as this containing amino groups include Tegosivin L 49, a product of Th. Goldschmidt AG., the L 650 L, L 651 and VP 1306 types made by Wacker, Silan AFL 40, a product of Union Carbide, and the mixtures described in U.S. Patents 3,386,371 and 3,890,271 assigned to Dow Corning. The silicone oil is preferably used together with a wax containing acid groups. The amount of silicone oil in the preparations according to the invention is from 0.2 to 7% by weight, and preferably from 0.3 to 3% by weight, expressed as solvent-free product.

Standard additives

In addition to the constituents mentioned above, the preparations may contain standard additives, more especially dyes and perfume oils. In general, these constituents are present in a quantity below 1% by weight, i.e., from 0 to 1%, and preferably in a quantity of from 0.001 to 1% by weight.

Organic solvents

The organic solvent used is an apolar aprotic compound which has a high dissolving power for the active substances. Particularly suitable organic solvents include hydrocarbons and chlorinated hydrocarbons, such as gasoline having a boiling range of from 130° to 300° C., trichloroethylene and trichloroethane, although other solvents, such as turpentine oil, butanol and butyl acetate, may also be present in small quantities. A gasoline low in and free from aromatic fractions with a boiling range of 140° to 220° C. is particularly preferred.

The active substance amount of the floor preparations may vary within wide limits of from about 5 to 60% by weight, depending on whether a liquid, semipasty or pasty product is required. Pasty products generally have an active substance content of from 20 to 60% by weight; semi-pasty products normally have a solids content of from 18 to 30% by weight; and the preferred liquid form of the preparations normally has an active substance content of from 5 to 22% by weight, and preferably from 10 to 18% by weight.

The production of the preparations does not involve any particular problems. In general, the individual components are introduced onto a mixing vessel in liquid or pre-dissolved form and are mixed with one another therein either all at once or in stages. The mixing process is preferably carried out in the absence of oxygen in order to avoid premature resinification of the product.

The preparations according to the invention may be sucessfully used on virtually all porous floor coverings. However, they may be used with particular advantage on porous, inorganic materials, more especially clay tiles. In this case, the preparations are applied in a quantity of approximately 15 to 50 ml per application and per square meter of floor and spread uniformly over the floor. The active substances should preferably be applied in a quantity of from 4 g to 20 g per square meter, depending on the active substance content of the preparations, in one or more applications. After infiltration of the preparations, evaporation of the solvent and a brief drying period, the floors may be polished. The described floor care method is both simple and effective.

In one particularly preferred embodiment of the process according to the invention, the preparations are applied to tiles which have already been given a water-repellent and oil-repellent finish by treatment with a polymeric fluorocarbon compound and a silicone resin. In this case, the floor care method provides for particularly long-lasting protection.

EXAMPLE I

This examples illustrates the production of a floor care preparation in accordance with this invention.

In a heated 200 liter tank, 120.0 kg oxidized paraffin wax (acid number 3.5, alkali metal and alkaline earth soap content 6% by weight), 75.0 kg fully refined paraffin (solidification point 58° to 60° C.), 22.5 kg ozocerite (solidification point 71° to 73° C., light-colored), and 0.9 kg monoazo dye, brown (CI 12010)

were melted until clear while stirring at approximately 90° C. In a second 200 liter tank, 1247 kg low-aromatic white spirit (boiling range 145° to 200° C., aromatic content 18%) was heated to approximately 90° C. and then added with stirring to the wax melt. After cooling to room temperature of the wax dispersion formed, 15.0 kg silicone oil containing amino groups (50% solution in white spirit/n-butanol), 15.0 kg linseed oil varnish according to DIN 55932, and 15.0 kg perfume oil (citrus note)

were stirred in. The end product was packed in tin canisters.

EXAMPLE II

This example illustrates the care of Cotto tiles with various floor preparations.

Cotto tiles are rustic, unglazed, absorbent clay tiles which, in their unprotected state, readily develop water stains and absorb water-soluble and fat-soluble soil.

The product according to Examplle I was applied in a thin layer to the tiles three times in succession by simple spreading with a cotton cloth. After each application, the product was allowed to dry for 30 minutes at room temperature. The total quantity applied amounted on average to 12 g/m². Untreated Cotto tiles and Cotto tiles which had been treated three times with a standard commercial floor wax (a), with a standard commercial self-shine dispersion (b) and with linseed oil (c) were used for comparison. In the case of the linseed oil, the total drying time was 1 month.

Equal quantities of water and of olive oil were applied dropwise to the tiles thus treated. After 0.5, 2, 6 and 24 hours, the drops, where they were still visible, were wiped off and the remaining stains visually assessed. The staining intensity was evaluated on a scale of 0 (stain-free) to 10 (intensive staining). The results are shown in the following Table.

TABLE

| Floor-care preparation | Soiling behavior (evaluation scale, 0–10 points) | | | | | | | |
|---|---|---|---|---|---|---|---|---|
| | Water contact time (hours) | | | | Olive oil contact time (hours) | | | |
| | 0.5 | 2 | 6 | 24 | 0.5 | 2 | 6 | 24 |
| — | 2 | 4 | 4 | 4 | 4 | 6 | 9 | 10 |
| Example I | 0 | 0 | 0 | 0 | 0 | 0 | 1 | 1 |
| a | 0 | 0 | 1 | 1 | 1 | 2 | 5 | 6 |
| b | 0 | 1 | 3 | 5 | 1 | 1 | 4 | 4 |
| c | 0 | 0 | 1 | 1 | 0 | 0 | 1 | 2 |

It is clear from the test results that the preparations according to the invention afford extremely effective protection both against water and against oil stains. In most cases, they are distinctly superior in their effect to the standard commercial preparations and, in addition, dry in a very much shorter time compared with the linseed oil.

We claim:

1. A floor care preparation free of water and emulsifying agent for floors of porous inorganic materials consisting of, based on the weight of the preparation;
   (a) from about 2 to about 15% by weight hard wax,
   (b) from about 2 to about 15% by weight solid paraffin,
   (c) from about 0.2 to about 15% by weight microcrystalline wax,
   (d) from about 0.5 to about 5% by weight linseed oil,
   (e) from about 0.2 to about 7% by weight aminofunctional silicone oil,
   (f) from 0 to about 1% by weight standard additives, and
   (g) ad 100% by weight apolar, aprotic organic solvent.

2. A floor care preparation as in claim 1 wherein said hard wax (a) is selected from the group consisting of a polyethylene wax, montanic acid and/or montanic ester wax, oxidized paraffin wax, and a mixture thereof.

3. A floor care preparation as in claim 1 wherein said solid paraffin (b) consists of a refined paraffin having a solidification point of from about 52° to about 62° C.

4. A floor care preparation as in claim 1 wherein said microcrystalline wax (c) has a solidification point of from about 65° to about 100° C.

5. A floor care preparation as in claim 1 wherein said aminofunctional silicone oil (e) contains from about 0.05 to about 5% by weight nitrogen in the form of amino groups.

6. A floor care preparation as in claim 1 wherein said organic solvent (g) consists of a low aromatic content gasoline having a boiling range of about 130° to about 300° C.

7. A floor care preparation free of water and emulsifying agent for floors of porous inorganic materials consisting of, based on the weight of the preparation:
   (a) from about 5 to about 10% by weight hard wax selected from the group consisting of montanic acid wax, montanic ester wax, oxidized synthetic paraffin wax, polyethylene wax, and mixtures thereof;
   (b) from about 3 to about 8% by weight refined paraffin having a solidification point of from about 52° to about 62° C.;
   (c) from about 0.5 to about 5% by weight microcrystalline wax having a solidification point of from about 66° to about 76° C.;
   (d) from about 0.5 to about 3% by weight linseed oil varnish;
   (e) from about 0.3 to about 3% by weight silicone oil containing from about 0.05 to about 5% by weight nitrogen in the form of amino groups;
   (f) from about 0.001 to about 1% by weight dye and/or perfume oil; and
   (g) ad 100% by weight low aromatic content gasoline having a boiling range of about 140° to about 220° C.

8. A process for the treatment of a floor made of a porous, inorganic material comprising applying to said floor a composition free of water and emulsifying agent consisting of, based on the weight of said composition;
   (a) from about 2 to about 15 by weight hard wax,
   (b) from about 2 to about 15% by weight solid paraffin,
   (c) from about 0.2 to about 15% by weight microcrystalline wax,
   (d) from about 0.5 to about 5% by weight linseed oil,
   (e) from about 0.2 to about 7% by weight aminofunctional silicone oil,
   (f) from 0 to about 1% by weight standard additives, and
   (g) ad 100% by weight apolar, aprotic organic solvent.

9. A process as in claim 8 wherein said composition is applied to said floor in a quantity of from about 15 to about 50 ml/m².

10. A process as in claim 8 wherein said hard wax (a) is selected from the group consisting of a polyethylene wax, montanic acid and/or montanic ester wax, oxidized paraffin wax, and a mixture thereof.

11. A process as in claim 8 wherein said solid paraffin (b) consists of a refined paraffin having a solidification point of from about 52° to about 62° C.

12. A process as in claim 8 wherein said microcrystalline wax (c) has a solidification point of from about 65° to about 100° C.

13. A process as in claim 8 wherein said aminofunctional silicone oil (e) contains from about 0.05 to about 5% by weight nitrogen in the form of amino groups.

14. A process as in claim 8 wherein said organic solvent (g) consists of a low aromatic content gasoline having a boiling range of about 130° to about 300° C.

15. A process as in claim 8 wherein said porous, inorganic material comprises unglazed tile.

16. A process as in claim 8 including pretreating said floor with a polymeric fluorocarbon compound and a silicone resin.

* * * * *